United States Patent [19]
Yamamoto et al.

[11] Patent Number: 6,159,546
[45] Date of Patent: *Dec. 12, 2000

[54] PROCESS OF CONTINUOUSLY COATING AN ORGANOMETALLIC COATING COMPOSITION ON A RUNNING SUBSTRATE

[75] Inventors: Tetsuya Yamamoto, Suita; Akio Naka, Takatsuki; Yukiko Nishio, Owariasahi, all of Japan

[73] Assignee: Nippon Shokubai Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/807,756

[22] Filed: Feb. 27, 1997

[30] Foreign Application Priority Data

Feb. 28, 1996 [JP] Japan ................................. 8-041902

[51] Int. Cl.⁷ .................................. B05D 3/02; B05D 3/12
[52] U.S. Cl. ........................ 427/358; 427/387; 427/419.8
[58] Field of Search ................................. 427/358, 419.8, 427/387

[56] References Cited

U.S. PATENT DOCUMENTS

| | | |
|---|---|---|
| 3,802,908 | 4/1974 | Emmons .................................. 118/314 |
| 4,151,149 | 4/1979 | Smith . |
| 5,175,028 | 12/1992 | Tanaka et al. ........................ 427/407.1 |
| 5,202,164 | 4/1993 | Takahashi et al. ...................... 118/410 |
| 5,206,056 | 4/1993 | Shibata et al. .......................... 118/410 |
| 5,318,804 | 6/1994 | Yoshida ................................... 427/358 |
| 5,397,600 | 3/1995 | Shibata et al. .......................... 427/358 |
| 5,439,711 | 8/1995 | Vu et al. . |
| 5,639,514 | 6/1997 | Jones et al. ............................. 427/358 |
| 5,670,214 | 9/1997 | Saito et al. .............................. 427/358 |
| 5,728,770 | 3/1998 | Yamamoto et al. ..................... 524/755 |

FOREIGN PATENT DOCUMENTS

| | | |
|---|---|---|
| 0 255 238 | 2/1988 | European Pat. Off. . |
| 0 275 802 | 7/1988 | European Pat. Off. . |
| 0 287 403 | 10/1988 | European Pat. Off. . |
| 0 578 469 | 1/1994 | European Pat. Off. . |
| 671 450 A1 | 9/1995 | European Pat. Off. . |
| 0 686 435 | 12/1995 | European Pat. Off. . |
| 6-279678 | 10/1994 | Japan . |
| 1049868 | 11/1966 | United Kingdom . |
| 2 031 301 | 4/1980 | United Kingdom . |

OTHER PUBLICATIONS

Database WPI, Section Ch, Week 8343, Derwent Publications Ltd., London GB; Class A14, AN 83–798952, XP002033226. (no date).

International Patent Classification 6, vol. 3, Section C: Chemistry, Metallurgy, 1994, WIPO, XP 002033225. (no month date).

*Primary Examiner*—Katherine A. Bareford
*Attorney, Agent, or Firm*—Oblon, Spivak, McClelland, Maier & Neustadt, P.C.

[57] ABSTRACT

A process for producing a coated film continuously, comprises the steps of:

running a substrate film; and extruding a coating composition having a viscosity of 0.1 to 100 cps at 20° C. through a slit of a die onto a surface of the substrate film to produce a coating layer having a thickness of 0.1 to 20 μm over the substrate film. According to the present invention, it is possible to produce a coated film continuously at high speed, using a coating material having a viscosity as low as water or a coating material with a problem of deterioration due to the exposure to the air, thereby producing a coating layer over the substrate film to a uniform thickness.

19 Claims, 2 Drawing Sheets

PROCESS OF CONTINUOUSLY COATING AN ORGANOMETALLIC COATING COMPOSITION ON A RUNNING SUBSTRATE

BACKGROUND OF THE INVENTION

1. Field of the Invention

The present invention relates to a process for producing a coated film continuously, by which a coating material having a low viscosity can be continuously applied onto the surface of a substrate film at high speed to produce a coating thin layer to a uniform thickness.

2. Description of the Related Art

Generally, processes for producing a coating layer onto the surface of a substrate film are categorized into two main types: a roller coating process and a spray coating process. In the roller coating process, a coating material is applied through a roller onto the surface of a running substrate film, while in the spray coating process, a coating material is sprayed from spray nozzles onto the surface of a substrate film. The roller coating process is further categorized into many types such as a doctor blade coating process using a doctor blade to control the thickness of a coating layer, an air knife coating process using an air knife to control the thickness of a coating layer, a direct gravure coating process using a sculptured gravure roller, a reverse roller coating process using a plurality of rollers which rotate inversely, a dip coating process in which a substrate film is dipped into a coating solution bath, a kiss coating process, a squeeze coating process and the like.

In the roller coating process, a coating material having a high viscosity is usually applied onto the surface of a substrate film directly. On the other hand, a coating material having a low viscosity is usually accommodated in a pan so as to be applied onto the surface of a substrate film through an applicator roller, as is shown in FIG. 3.

In the process of applying a coating material accommodated in the pan, however, there are some problems as below described. First, it is impossible to use up all the coating material in the pan, and therefore, this process is not economical in the application of expensive coating material even though using a gravure roller with transfer rate of 90%. In addition, in the application of the emulsion type coating material, such a material has too low viscosity to be conveyed through the applicator roller to the point where the coating material is applied to the substrate film. To solve this problem, there is a way in which a viscosity adjustor (a leveling agent) is added to a coating material to increase the viscosity thereof to the level capable of being applied onto the substrate film. This way is effective as far as the leveling agent does not adversely affect the physical properties of the resultant coating layer; however, the leveling agent is not suitable for the production of a tight coating layer with gas barrier properties. Moreover, in the conventional coating process, the maximum speed of accurate coating is 200 m/min at most, and therefore, there is a demand for a process of applying a coating material at higher speed.

When an organometallic compound-system coating composition is used for producing a coating layer with gas barrier properties, there also arise problems as below described. The organometallic compound-system coating composition undergoes hydrolytic condensation by absorbing moisture present in the air. Therefore, If the roller coating process is employed, the coating material is always exposed to the air, resulting in problems such as an increase in the viscosity, change in the solid concentration, and gelation during the coating process. On the other hand, the spray coating process adopting a closed-type system is useful as far as there is no need to produce a tight coating layer such as adhesives; however, this process is not adequate for the production of coating layer having gas barrier properties, because the resultant coating layer lacks uniformity and continuity. The problem due to the exposure to the air also arises in a coating composition easy to be oxidized and photocurable coating composition.

SUMMARY OF THE INVENTION

The object of the invention is to provide a process for producing a coated film continuously at high speed, using a coating material having a viscosity as low as water or a coating material with a problem of deterioration due to the exposure to the air, thereby producing a coating layer over the substrate film to a uniform thickness.

According to an aspect of the present invention, a process for producing a coated film continuously, comprises the steps of:

running a substrate film; and extruding a coating composition having a viscosity of 0.1 to 100 cps at 20° C. through a slit of a die onto a surface of the substrate film to produce a coating layer having a thickness of 0.1 to 20 μm over the substrate film.

The coating composition preferably gives gas barrier properties to the coating layer. The process of the present invention is especially effective in the case where a leveling agent cannot be used to produce a gas barrier coating layer.

The coating composition is preferably a polyvinylidene chloride resin, or may be an organometallic compound-system coating composition.

The organometallic compound-system coating composition preferably comprises:

an organometallic compound of the formula (I) and/or a hydrylytic condensation product thereof:

$$R^1_m M(OR^2)_n \qquad (I)$$

wherein M is a metal element; $R^1$ is the same or different hydrogen atom, a lower alkyl group, an ally group, a mercapto group directly bonded with a vinyl group or a carbon chain, or (meth)acryloyl group; $R^2$ is the same or different hydrogen atom, a lower alkyl group, or an acryl group; $R^1$ and $R^2$ may have an arbitrary substituent; m is 0 or a positive integer; n is an integer of 1 or more; and (m+n) is equal to the valency of metal element M; and a solvent.

A part or all the organometallic compound (I) is preferably an organosilane compound having $R^1$ having an amino group as a substituent.

The organometallic compound-system coating composition preferably further contains an organic compound (II) having a primary or secondary amino group in its molecule. Especially, polyethyleneimines are used as the organic compound (II), the formation of the coating layer is facilitated, and in addition, the resultant coating layer has excellent properties including gas barrier properties. In this case, the organometallic compound (I) may have no amino group.

The coating composition preferably further contains an organic compound (III) having a functional group (especially epoxy group) reactable with the amino group in its molecule. This facilitates the formation of a coating layer, and in addition, the resultant coating layer has excellent gas barrier properties. It is also possible to produce further excellent gas barrier coating layer if the organic compound (III) has hydrolytic group in addition to functional group reactable with the amino group in its molecule.

The present invention also relates to a coated film produced by a process of the present invention.

A coated film preferably has an oxygen permeability of 20 cc/m$^2$.24 hrs.atm or lower at 20° C. and 80% RH. This is especially desired when the coated film is used as a gas barrier film.

The coated film preferably has a surface smoothness of ±25%.

In order to evaluate the uniformity of the coating layer produced on the surface of the substrate film, the thickness of the coating layer is measured at arbitrary points thereof, and the resultant values are averaged. The degree of variations of the thickness from the average value is referred to as a surface smoothness, which is an indicator of the uniformity of the coating layer. It is preferable that the coating layer has the surface smoothness falling within ±25% of the average value at all the measuring points. For usual applications, the surface smoothness falling within ±25% is enough. In the case where the coated film is used as a material for liquid crystal display devices, the preferable surface smoothness is within ±10%, and more preferably ±3%, because the uniformity is important for such devices to achieve high image quality.

DETAILED DESCRIPTION OF THE PREFERRED EMBODIMENT

Referring to the accompanying drawings, the embodiments of the invention will be described below.

Figure 1:
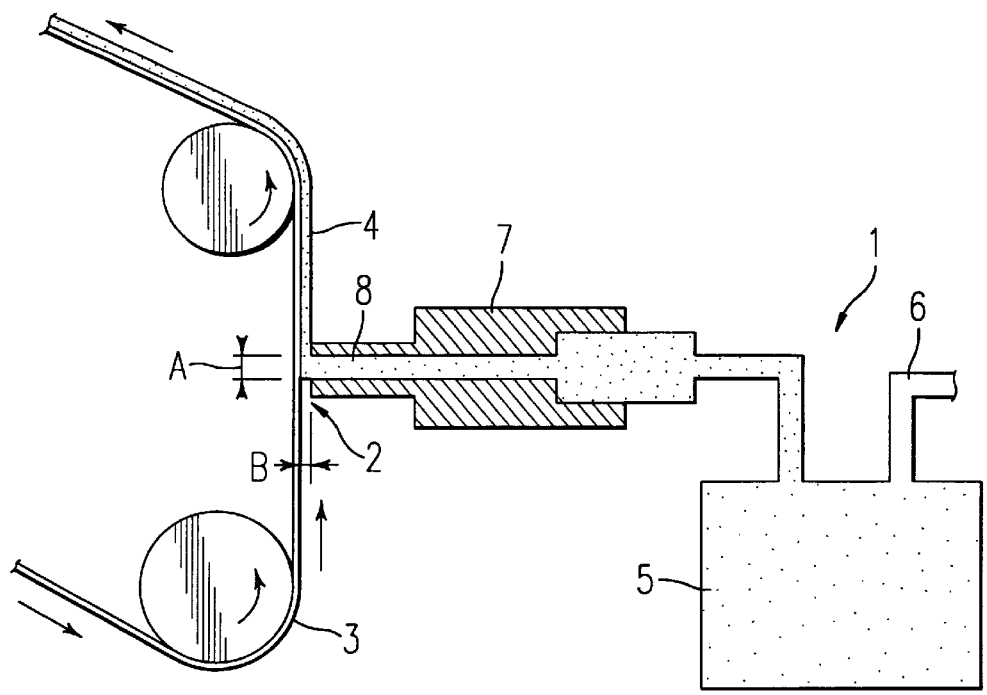
FIG. 1 is a side view illustrating a process for producing a coated film according to the present invention.
Figure 2:
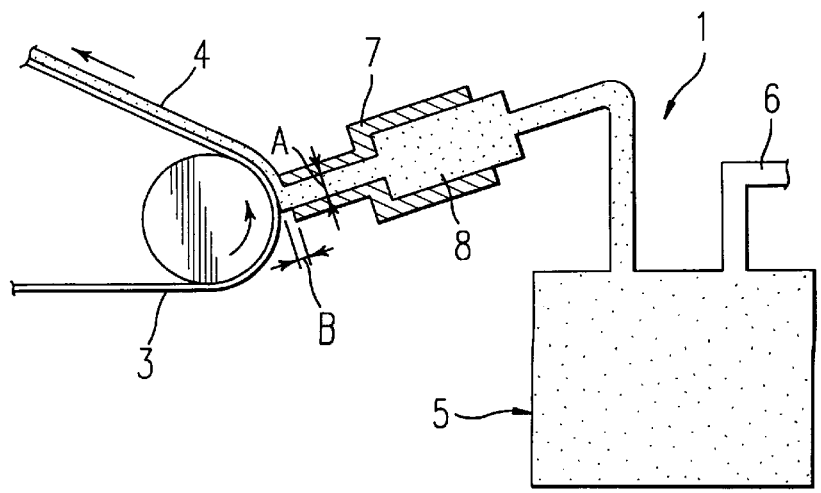
FIG. 2 is a side view illustrating another process for producing a coated film according to the present invention.

In a process for producing a coated film continuously of the present invention, a coating composition having a low viscosity is extruded through a slit of a die onto the surface of a substrate film to produce a coating layer. The coating composition is extruded under pressure by a pump or the introduction of nitrogen gas FIGS. 1 and 2 are side views illustrating a process for producing a coated film continuously according to the present invention. In FIG. 1, a substrate film is running from bottom to top, and a slit, extending in the direction crosswise the running direction of the substrate film, is located near the substrate film. In FIG. 2, a slit extends in the direction intersecting at right angle with a tangent line between a roller and a substrate film. It is constructed such that a running direction of a substrate film and an angle of a slit can be optimally adjusted.

In FIGS. 1 and 2, the reference numerals 1 denote an extruder, 2 a slit of die, 3 a substrate film, 4 a coating layer, 5 a tank, and 6 a gas introduction pipe. The extruder 1 is not specifically limited, and a pressure application in the extruder 1 is conducted by supplying a compressed or uncompressed inert gas such as nitrogen gas or dried air containing no moisture, or by using a pressure pump in a closed or opened type system. The use of closed type extruder is recommended for an organometallic compound-system coating composition easy to react with moisture present in the air, a coating composition easy to be oxidized, and a photocurable type coating composition. FIGS. 1 and 2 show closed type extruders as an example. The width of the slit is adjusted to match with that of a substrate film to be coated.

A coating composition used in the present invention has a low viscosity of 0.1 to 100 cps at 20° C. According to the present invention, a coating composition having such a low viscosity can be optimally extruded through a slit onto the surface of a substrate film. As a result, it is possible to produce a coating thin layer to a uniform thickness in a range between 0.1 to 20 μm with high accuracy. With the viscosity of less than 0.1 cps, it is difficult to produce a thin coating layer to a uniform thickness even though employing the process of the present invention. With the viscosity of more than 100 cps, coating processes other than that of the present invention can be employed. In order to fully exploit the effect of the present invention of coating a low-viscosity composition to a uniform and thin thickness, the viscosity of the composition preferably falls within the range between 1 to 50 cps, and more preferable upper limit is 20 cps. The application speed of the coating material can be increased to 550 at the maximum. It is recommended that the coating speed is usually in the range between 10 to 550 m/min, preferably 30 to 500 m/min, and more preferably 50 to 450 m/min.

In the present invention, a desired amount of coating material is directly applied onto the substrate film, and there is no need to adjust the application amount of coating material using knife or blade, thereby eliminating the waste of the coating material. In addition, the use of a closed type extruder prevents the coating material from being exposed to the air in the way from a tank 4 to a slit 2 during the coating process. As a result, even though using an organometallic compound-system coating composition, a coating composition easy to be oxidized or a photocurable coating composition, it becomes possible to continuously produce a coating layer without causing deterioration such as an increase in the viscosity, change in the solid concentration, and gelation of the coating material during the application process.

In the present invention, the thickness of a coating layer after dried is determined based on the solid concentration of the coating composition, running speed of a substrate film, a height A of the gap of slit 2, and a distance B between the surface of a substrate film 3 and the edge of a slit 2. Preferable thickness of a coating layer is in the range between 0.1 to 20 μm in a dried state, and more preferably in the range between 0.5 to 20 μm. It is difficult to produce a coating layer to a uniform thickness of less than 0.1 μm, because pinholes will easily occur. On the other hand, if the coating layer is in the thickness of larger than 20 μm, cracks will easily occur. The most preferable upper limit of thickness of the coating layer is 10 μm or less. If the coating layer is desired to have gas barrier properties, the preferable thickness is in the range between 0.5 to 10 μm, and more preferably in the range between 1 to 5 μm, and the most preferably in the range between 2 to 4 μm.

Subsequent to the coating process, a coating layer is dried by being passed through a heating furnace adjusted at 40° C. or higher. The heating temperature of the coating layer is dependent on the heat resistance of the substrate film, and preferably in the range between 50 to 120° C. When using an organometallic compound-system coating composition, it is preferable to moisten a produced coating layer at 5% RH or more before, during, or after the heating process. In this manner, hydrolytic condensation of the coating composition is promoted to produce a tight coating layer.

The substrate film may be any of materials. Examples of such materials include: copolymers of ethylene and vinyl alcohol; polyvinylidene chloride resins; polyolefin resins such as polyethylene and polypropylene; polyester resins such as polyethyleneterephthalate, polyethyleneisophthalate, polyethylene-2,6-naphthalate, polybutyleneterephthalate, copolymers thereof and the like; polyoxymethylene; polyamide resins; thermoplastic resins such as polystyrene, poly(meth)acrylate, polyacrylonitrile, polyvinyl acetate, polycarbonate, cellophane, polyimide, polyetherimide, polyphenylenesulfone, polysulfone, polyether ketone, polyethersulfone, polyallylate, ionomer resins, fluororesins and the like; and thermosetting resins such as melamine resins, polyurethane resins, epoxy resins, phenolic resins, unsaturated polyester resins, alkyd resin, urea resins, silicone resins and the like. These may contain a known additive, and also may be subjected to surface activation treatment such as corona treatment, or known anchoring treatment using an urethane resin, polyethyleneimine and the like. Or alternatively, paper may be used as a substrate film.

Type of coating composition used in the present invention is not specifically limited as far as it has a viscosity in the range between 0.1 to 100 cps at 20° C. Examples of the type of coating composition include aqueous solution type, emulsion type, and organic solvent type. In addition, the coating composition may include any kinds of compositions to give physical properties such as adhesiveness, magnetism, gloss, ability of heat sealing, water resistance, chemical resistance, antistatic properties, good slip properties, release properties, and the like, or may include an under-coating agent, and the like.

According to the present invention, it is possible to avoid the waste of the coating material, and in addition, to continuously produce a coating thin layer to a uniform thickness at high speed. Accordingly, the process of the present invention is preferably used to produce a coating layer to a uniform and thin thickness using an expensive coating material for giving gas barrier properties.

Preferable examples of compositions constituting a coating material for giving gas barrier properties include polyvinylidene chloride system composition, ethylene-vinyl alcohol copolymer system composition, and organometallic compound-system composition, all of which give excellent gas barrier properties. Examples of polyvinylidene chloride system composition include: polyvinylidene chloride latex type composition, produced by emulsion copolymerization of 60 wt % or more of vinylidene chloride as a main component and 40 wt % or less of vinyl monomer such as acrylo-nitrile, (meth)acrylate, (meth)acrylic acid and the like; and a solvent type composition dissolved into an organic solvent.

Next, an organometallic compound-system coating composition for giving gas barrier properties will be described. The organometallic compound-system coating composition includes, as main constituents, an organometallic compound (I) represented by the following formula and/or a hydrolytic condensation product thereof:

$$R^1{}_mM(OR)^2{}_n \qquad (I)$$

wherein M is a metal element; $R^1$ is the same or different hydrogen atom, a lower alkyl group, an aryl group, a mercapto group directly bonded with a vinyl group or a carbon chain, or (meth)acryloyl group; $R^2$ is the same or different hydrogen atom, a lower alkyl group, or an acyl group; $R^1$ and $R^2$ may have an arbitrary substituent; m is 0 or a positive integer; n is an integer of 1 or more; and (m+n) is equal to the valency of metal element M; and
a solvent.

The organometallic compound undergoes the hydrolytic condensation in the presence of water to produce a tight coating layer having a three-dimensional structure. The obtained coating layer has gas barrier properties equal to or more than those of a polyvinylidene chloride-system layer. In this case, however, the organometallic compound may undergo the hydrolytic condensation even with moisture present in the air. Therefore, it is not adequate to employ a conventional open-type rolling coating process, because it will cause problems such as change in solid concentration and gelation of the coating material. Such problems can be avoided by employing the coating process of the present invention, especially in combination with a closed-type extruder. In this structure, a coating material is never exposed to the air in the way from a tank to a slit, thereby continuously producing a coating thin layer to a uniform thickness.

Specific examples of the organometallic compound include: alkoxysilanes such as tetramethoxysilane, tetraethoxysilane, tetraisopropoxysilane, tetrabutoxysilane, methyltrimethoxysilane, methyltriethoxysilane, methyltriisopropoxysilane, methyltributoxysilane, ethyltrimethoxysilane, ethyltriethoxysilane, ethyltriisopropoxysilane, ethyltributoxysilane, dimethyldimethoxysilane, dimethyldiethoxysilane, dimethyidiisopropoxysilane, dimethyldibutoxysilane, diethyldimethoxysilane, diethyldiethoxysilane, diethyldiisopropoxysilane, diethyldibutoxysilane, vinyltrimethoxysilane, vinyltriethoxysilane, vinyltriethoxysilane, vinyltriisopropoxysilane, vinyltributoxysilane, γ-mercaptopropyltrimethoxysilane, γ-mercaptopropyltriethoxysilane, γ-methacryloxypropyltrimethoxysilane, γ-methacryloxypropyltriethoxysilane and the like; acyloxysilanes such as tetraacetoxysilane, methyltriacetoxysilane and the like; silanols such as trimethylsilanol and the like; titanium alkoxides such as titanium tetraethoxide, titanium tetraisopropoxide, titanium tetrabutoxide and the like; zirconium alkoxides such as zirconium tetraethoxide, zirconium tetraisopropoxide, zirconium tetrabutoxide and the like; and aluminum alkoxides such as aluminum triethoxide, aluminum triisopropoxide, aluminum tributoxide and the like. These compounds may be used alone or in a mixture of two or more of them.

An organic silane compound containing amino group as an arbitrary substituent group is preferably used as the organometallic compound. Use of the organometallic compound facilitates the formation of a coating layer, and in addition, thus-obtained coating layer has excellent gas barrier properties. Examples of organic silane compound containing amino group include N-β-(aminoethyl)-γ-aminopropyltrimethoxysilane, N-β-(aminoethyl)-γ-aminopropyltriethoxysilane, N-β-(aminoethyl)-γ-aminopropyl-triisopropoxysilane, N-β-(aminoethyl)-γ-aminopropyl-tributoxysilane, N-β-(aminoethyl)-γ-amino-propyl-methyidimethoxysilane, N-β-(aminoethyl)-γ-amino-propyl-methyidiethoxysilane, N-β-(aminoethyl)-γ-aminopropylmethyidiisopropoxysilane, N-β-(aminoethyl)-γ-aminopropylmethyidibutoxysilane, N-β-(aminoethyl)-γ-amino-propylethyidimethoxysilane, N-β-(aminoethyl)-γ-amino-propylethyldiethoxysilane, N-β-(aminoethyl)-γ-aminopropylethyldiisopropoxysilane, N-β-(aminoethyl)-γ-aminopropylethyidibutoxysilane, γ-aminopropyltrimethoxysilane, γ-aminopropyltriethoxysilane, γ-amino-propyltriisopropoxysilane, γ-amino-propyl-tributoxysilane, γ-amino-propylmethyidimethoxysilane, γ-amino-propyl-methyidiethoxysilane, γ-amino-propyl-methyidiisopropoxysilane, γ-aminopropylmethyldibutoxysilane, γ-amino-propyl-ethyldimethoxysilane, γ-amino-propyl-ethyidiethoxysilane, γ-amino-propyl-ethyidiisopropoxysilane, γ-amino-propyl-ethyldibutoxysilane, γ-amino-propyl-triacetoxysilane, γ-(2-ureidoethyl)amino-propyl-trimethoxysilane, γ-(2-ureidoethyl)amino-propyl-triethoxysilane, γ-ureidopropyltriethoxysilane, N-β-(N-vinylbenzilaminoethyl)-γ-amino-propyl-trimethoxysilane and the like. These compounds may be used alone or in a mixture of two or more of them.

The organometallic compound (I) may be subjected to hydrolytic condensation reaction in advance in order to prevent vaporization during the drying process after coating process. In the case where the organic silane compound containing amino group is used as a part of the organometallic compound (I), it is preferable that the silane compound containing amino group is subjected to hydrolytic condensation reaction in advance, and after that, is mixed with other organometallic compounds. In this manner, a coating composition gains further stability. Or alternatively, the organometallic compound (I) may be subjected to co-hydrolytic condensation reaction with any of compounds containing hydrolyzable groups selected from compounds (III) which will be described later. These (co)hydrolytic condensation reaction may be conducted using a known catalyst, and preferably, may be conducted in a solvent which will be described later.

The organometallic compound-system coating composition may contain an organic compound (II) containing primary and/or secondary amino groups in its molecule. Using the organic compound (II), it becomes possible to reduce the amount of expensive organometallic compound used (especially, silane compound containing amino group) without deteriorating gas barrier properties, and in addition, to easily form a coating layer with excellent physical properties such as good flexibility. Specific examples of the organic compound (II) include: low-molecular organic compounds such as allylamine, diallylamine, isopropylamine, diisopropylamine, imino-bisropylamine, ethylamine, diethylamine, 2-ethylhexylamine, 3-ethoxypropylamine, diisobutylamine, 3-diethylaminopropylamine, di-2-ethylhexylamine, dibutylaminopropylamine, propylamine, dimethylaminopropylamine, methyliminobispropylamine, 3-methoxypropylamine, ethylenediamine, 1,4-diaminobutane, 1,2-diaminopropane, 1,3-diaminopropane, hexamethylenediamine, ethanolamine, diethanolamine and the like; organic polymers, for example, polyethyleneimine such as Epomin series (EpominSP-003, EpominSP-006, EpominSP-012, EpominSP-018, EpominSP-103, EpominSP-110, EpominSP-200, EpominSP-300, EpominSP-1000, EpominSP-1020 and the like; product names, manufactured by Nippon Shokubai Co.); polyallylamine (for example, PAA-L, PAA-H, and the like; product names, manufactured by Nitto Boseki Co.); homopolymers of amino group-containing (meth)acrylate such as dimethylaminoethyl (meth) acrylate, diethylaminoethyl (meth) acrylate and the like; copolymers of amino group-containing (meth)acrylate and other (meth)acrylates or (meth)acrylic acid; and polyoxyethylenealkylamine and the like.

Ethanol amine and organic polymers are preferable to give gas barrier properties, but organic polymers are especially preferable to form a coating layer easily. Among organic polymers, preferably used are polyethyleneimines capable of providing a coating layer having excellent physical properties including gas barrier properties. Preferable molecular weight of organic polymers used as the organic compound (II) is in the range between 250 to 200,000, and more preferably, in the range between 250 to 100,000. With the molecular weight of less than 250, the obtained coating layer is poor in its flexibility. With the molecular weight of more than 200,000, the obtained coating layer is poor in its clarity.

The amount of amino group-containing organic compound (II) used is not specifically limited; however, preferable amount is twice or less than the amount of organometallic compound (I) in weight. With the amount of more than twice, a resultant gas barrier coating layer is poor in its moisture resistance. Preferable amount of organic compound (II) used is 1.5 times or less than the amount of organometallic compound (I).

The organometallic compound-system coating composition may further include an organic compound (III) containing funtional groups which may react with amino group contained in the organic compound (II). It is more preferable that the organic compound (III) contains hydrolyzable groups such as alkoxysilyl groups. The use of the organic compound (III), which serves as a cross-linking agent, provides a tight coating layer having excellent gas barrier properties. The organic compound (III) is selected from the compounds having functional groups such as epoxy groups, carboxyl groups, isocyanate groups, oxazolinyl groups, hydroxyl groups and the like, and it is preferable that a plurality of functional groups are contained in the organic compound (III). In this case, the plurality of functional groups may be identical or independent from each other. Among these functional groups, epoxy groups have the best reactivity with amino group.

The organic compound (III) may contain hydrolytic alkoxysilyl groups in addition to functional groups (for example, epoxy groups, carboxyl groups, isocyanate groups, oxazolinyl groups, hydroxyl groups) which can react with amino group. In this case, while reacting with amino group contained in the organic compound (II), the organic compound (III) undergoes (co)hydrolytic condensation polymerization reaction alone or with the organometallic compound (I). The chemical bond with the organic compounds (I), (II), and (III) results in the formation of a gas barrier coating layer having high tightness as well as excellent flexibility. In order to impart enhanced water resistance to the resultant coating layer, the organic compound (III) preferably contains an aromatic ring or a hydrogenated ring thereof.

Specific examples of the organic compound (III) usable in the present invention include: aliphatic diglycidyl ethers such as ethylene glycol diglycidyl ether, diethylene glycol diglycidyl ether, triethylene glycol diglycidyl ether, tetraethylene glycol diglycidyl ether, nonaethylene glycol diglycidyl ether, propylene glycol diglycidyl ether, dipropylene glycol diglycidyl ether, tripropylene glycol diglycidyl ether, 1,6-hexanediol diglycidyl ether, neopentyl glycol diglycidyl ether, glycerol diglycidyl ether and the like; polyglycidyl ethers such as glycerol triglycidyl ether, diglycerol triglycidyl ether, triglycidyl tris(2-hydroxyethyl) isocyanurate, trimethylolpropane triglycidyl ether, pentaerythritol tetraglycidyl ether and the like; aliphatic or aromatic diglycidyl derivatives) such as bisphenol A diglycidyl ether, resorcinol diglycidyl ether, hydroquinone diglycidyl ether, bisphenol S diglycidyl ether, bisphenol F diglycidyl ether, compounds represented by the following formulae:

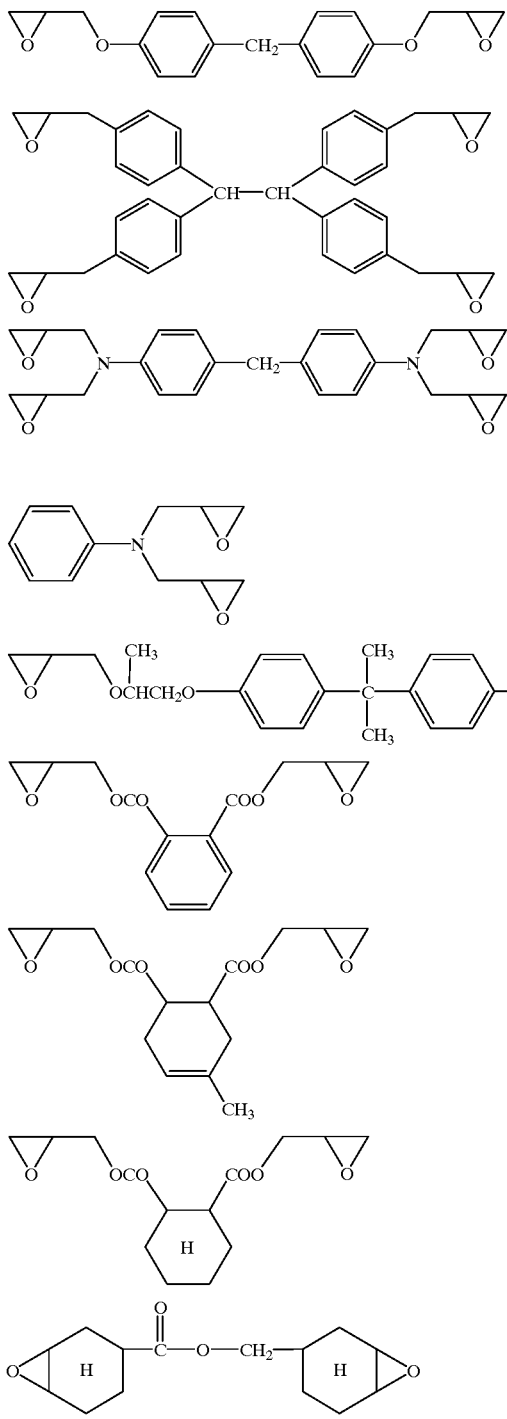
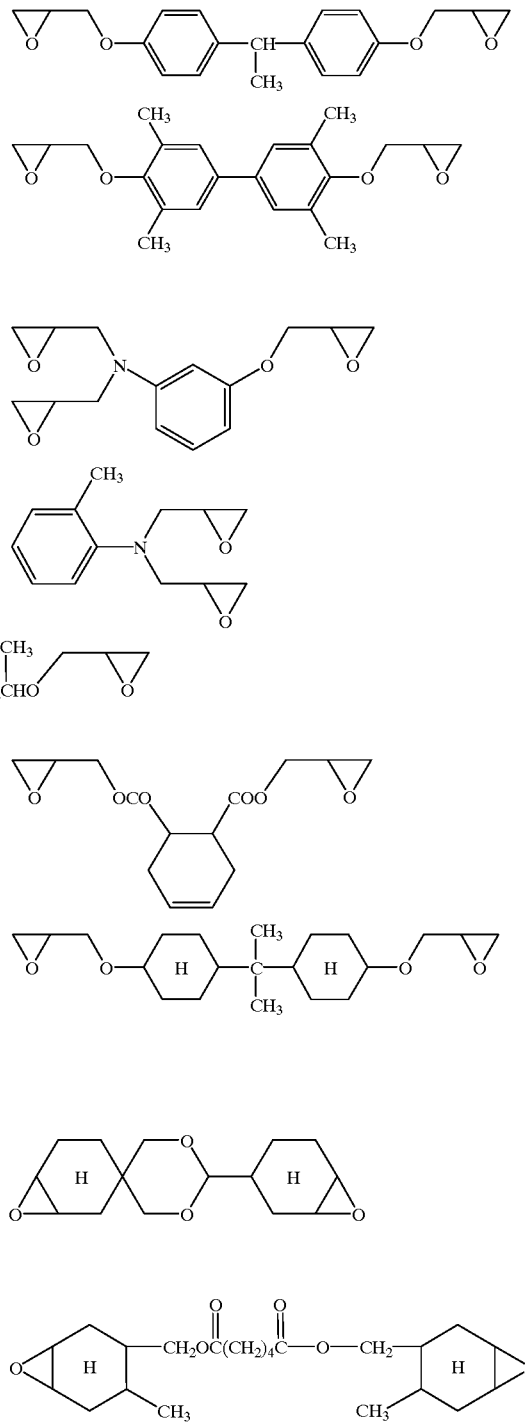

esters such as diglycidyl adipate, diglycidyl o-phthalate and the like; glycidyl compounds having an aromatic ring or a hydrogenated ring thereof (including nucleus-substituted oligxomers having glycidyl groups as functional groups such as bisphenol A diglycidyl ether oligomer represented by the following formula:

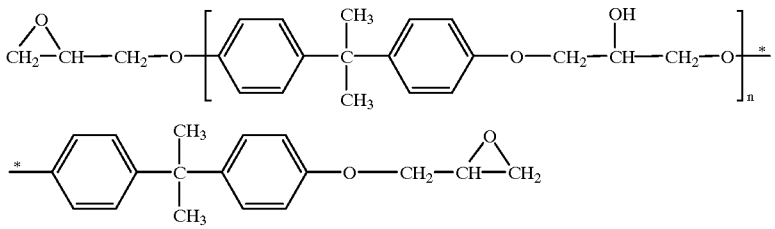

n=0 or an interger of 1 or more isocyanates such as hexamethylene diisocyanate, tolylene diisocyanate, 1,4-diphenylmethane diisocyanate, 1,5-naphthalene diisocyanate, triphenylmethane triisocyanate, tolidine diisocyanate, xylylene diisocyanate, dicyclohexylmethane diisocyanate and the like; dicarboxylic acids such as tartaric acid, adipic acid and the like; carboxyl group-containing polymers such as polyacrylic acid and the like; oxazolinyl group-containing polymers and the like. These compounds are examples of the compound (III) having reactivity with amino groups in the organic compound (II). These compounds may be used alone or in a mixture of two or more of them. Among these compounds used as the compound (III), a compound having an aromatic ring or a hydrogenated ring thereof (including nucleus-substituted derivatives) is effective for further enhancing water resistance of a gas barrier coating layer.

Further, the compound (III) includes the compound having reactivity with both the amino groups in the organic compound (II) and —M(OR$^2$) in the organometallic compound (I). That is, the compound contains hydrolyzable groups and functional groups which react with amino groups. Specific examples of the compound include: β-(3,4-epoxycyclohexyl) ethyl-trimethoxysilane, β-(3,4-epoxycyclohexyl) ethyl-triethoxysilane, β-(3,4-epoxycyclohexyl) ethyl-triisopropoxysilane, β-(3,4-epoxycyclohexyl) ethyl-methyl-dimethoxysilane, β-(3,4-epoxycyclohexyl) ethyl-methyl-diethoxysilane, γ-glycidoxy-propyl-trimethoxysilane, γ-glycidoxy-propyl-triethoxysilane, γ-glycidoxy-propyl-triisopropoxysilane, γ-glycidoxy-propyl-methyl-dimethoxysilane, γ-glycidoxy-propyl-methyl-diethoxysilane and the like (hereinafter, these may be referred to as an epoxy group-containing silane coupling agent); and γ-isocyano-propyl-trimethoxysilane, γ-isocyano-propyl-triethoxysilane, γ-isociano-propyl-methyl-dimethoxysilane, γ-isocyano-propyl-methyl-diethoxysilane and the like (hereinafter, these may be referred to as an isocyanate group-containing silane coupling agent). These compounds may be used alone or in a mixture of two or more of them.

Defining the equivalents of amino groups contained in the organic compound (II) as X and the equivalents of functional groups contained in the compound (III) as Y, It is recommended that the compound (III) is blended with the organic compound (II) in such a blending ratio that X/Y becomes 0.01 to 1.0, and more preferably, 0.05 to 0.3. With the value X/Y of less than 0.01, the obtained coating layer is likely to have insufficient flexibility. With the value X/Y of more than 1.0, the obtained coating layer is likely to have deteriorated gas barrier properties and heat resistance.

A solvent essentially used for organometallic compound-system coating composition is not limited, and it is preferable to use a solvent which will dissolve or disperse the constituent components of the gas barrier composition. Examples of the solvent include: alcohols such as methanol, ethanol, 2-propanol, butanol, ethylene glycol and the like; ketones such as acetone, methyl ethyl ketone, methyl isobutyl ketone and the like; aromatic hydrocarbons such as toluene, benzene, xylene and the like; hydrocarbons such as hexane, heptane, octane and the like; esters such as ethyl acetate, butyl acetate and the like; and other solvents such as tetrahydrofuran, propyl ether, water and the like. These solvents may be used alone or in a mixture of two or more of them.

As described above, the organometallic compound-system coating composition used in the present invention includes the organometallic compound (I) and the solvent as essential components and, if necessary, the amino group-containing organometallic compound (II) and the organic compound (III). In the case where the organic compound (III) has both hydrolyzable groups and functional groups which react with amino groups, it is recommended that the organic compound (III) and the organometallic compound (I) are subjected to (co)hydrolytic condensation reaction in advance simultaneously or independently. By the (co)hydrolytic condensation of the organometallic compound (I) and the organic compound (III) so as to be polymerized, the formation of gas barrier coating layer becomes easier, and in addition, the resultant coating layer has further increased uniformity and smoothness.

Although (co)hydrolytic condensation reaction can proceed with the moisture present in the air, it is preferable that the (co)hydrolytic condensation reaction is conducted in the aforementioned solvent. In this manner, the resultant product can be immediately used as a gas barrier coating material in the coating process. Moreover, it is also possible to conduct the (co)hydrolytic condensation reaction by adding known acids or bases as a reaction catalyst. When the (co)hydrolytic condensation reaction is conducted in advance, it is preferable that the molar ratio of water to the organometallic compound (I) (and the compound (III), if necessary) is 0.01 to 3.0 relative to hydrolytic condensation compound. With the moles of less than 0.01, cracks easily occur during the production of coating layer, and in addition, long time is required for drying the coating layer, which makes the rapid coating meaningless. The preferable bottom limit of the amount of water is 0.1 moles. On the contrary, too much water induces hydrolytic condensation reaction, resulting in deterioration of storage stability of coating composition. Preferable amount of water is 3.0 moles or less, and more preferably 2.0 moles or less, and the most preferably 0.8 moles or less.

The process of preparing a gas barrier coating composition is not specifically limited. However, in the case of using the compound (III), amino groups in the organic compound (II) are reacted with functional groups in the compound (III), and then, the organometallic compound (I) or the hydrolytic condensation product thereof is added thereto. In this manner, the resultant composition has excellent stability. In the case where the compound (III) contains hydrolyzable groups as well as functional groups having reactivity with amino group, it is recommend that, after crosslinking reaction of amino groups, (co)hydrolytic condensation reaction is conducted before or after the addition of the organometallic compound (I).

If the gas barrier coating layer is produced by using a coating composition comprising polyvinylidene chloride resin or the organometallic compound, it is preferable that the coating layer exhibits, as the gas barrier properties, oxygen permeability of 20 cc/m$^2$.24 hrs.atm or less at 20° C. and 80% RH, and more preferably, 5 cc/m$^2$.24 hrs.atm or less at 20° C. and 80% RH.

In order to evaluate the uniformity of the coating layer produced on the surface of the substrate film, the thickness of the coating layer is measured at arbitrary points thereof, and the resultant values are averaged. The degree of variations of the thickness from the average value is referred to as a surface smoothness, which is an indicator of the uniformity of the coating layer. It is preferable that the coating layer has the surface smoothness falling within ±25% of the average value at all the measuring points. For usual applications, the surface smoothness falling within ±25% is enough. In the case where the coated film is used as a material for liquid crystal display devices, the preferable surface smoothness is within ±10%, and more preferably ±3%, because the uniformity is important for such devices to achieve high image quality.

If necessary, the gas barrier coating composition can be mixed with inorganic or organic type additives such as curing catalyst, wettability modifier, plasticizer, antifoaming agent, thickner to the extent that they do not adversely affect the effects of the invention. Moreover, after producing a coating layer made of such a composition mixed with the additives, another layer for giving various properties may be produced over the coating layer by a process of the present invention or other processes, for example, laminating processes such as an extrusion process, a dry laminating process, a wet laminating process, a hot melt laminating process and the like. Or alternatively, the deposition may be conducted after the coating process.

According to the present invention, it is possible to continuously produce a coating thin layer to a uniform thickness at high speed with no waist of coating material, and In addition, the coating process can be carried out in a closed system continuously. Therefore, the coating composition is not limited to a polyvinylidene chloride resin, but can be a coating composition which will be adversely affected by the air or light, such as those made of organometallic compound-system composition, composition containing groups easy to be oxidized, photocurable composition and the like.

EXAMPLES

The present invention is described in detail below with reference to examples, but the invention is not limited to these examples.

Example 1

10 kg of polyvinylidene chloride latex (Saran latex L-502; product name, manufactured by Asahi Kasei Co.) having a viscosity of 10 cps at 20° C. was put into a tank 5 of a closed type extruder 1 shown in FIG. 1. Then, a height of gap of slit A is adjusted to 2 mm and a distance B between a substrate film and an edge of the slit is adjusted to 1 mm. The polyvinylidene chloride latex was continuously applied onto a polyethylene terephthalate film (hereinafter, referred to as a PET film) having a thickness of 12 μm which runs at a speed of 300 m/min, with extruding the polyvinylidene latex from the tank 5 by introducing nitrogen gas into the tank 5 through an introduction pipe. Following the coating process, the resultant was passed through a drying furnace at temperature of 100° C. so as to be dried. As a result, a coated film was obtained. The physical properties of the obtained coated film are shown in Table 1.

Example 2

The procedure of Example 1 was repeated except employing a extruder shown in FIG. 2; whereby a coated film was obtained. The physical properties of the obtained coated film are evaluated and the results are shown in Table 1.

Comparative Example 1

Figure 3:
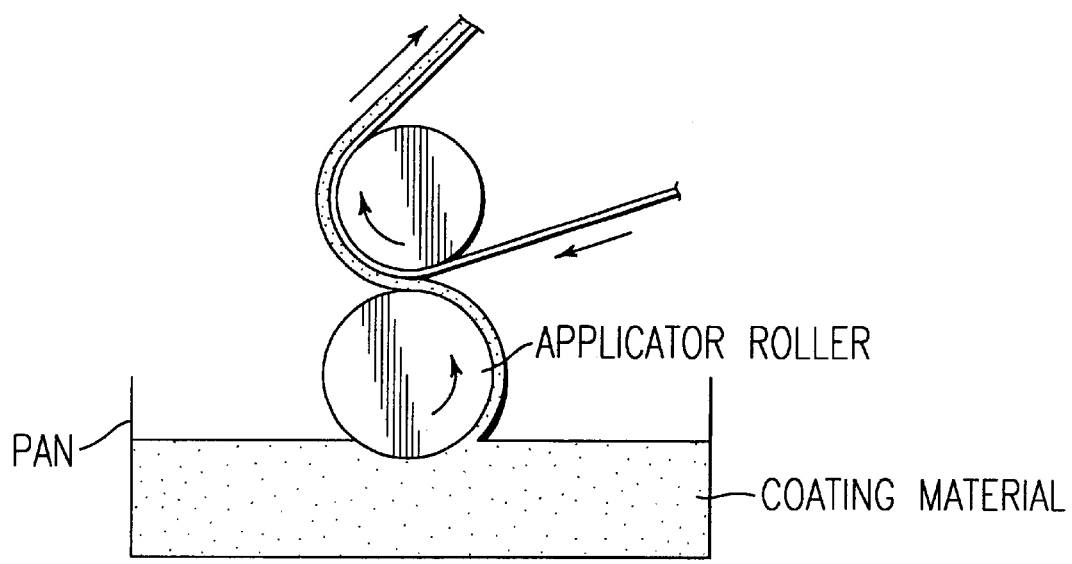
FIG. 3 is a side view illustrating a conventional process for producing a coated film using a direct gravure coater.

The polyvinilidene chloride latex used in Example 1 was applied onto a PET film having a thickness of 12 μm by using a direct gravure coater equipment shown in FIG. 3. The maximum speed of continuously producing a coating layer to a uniform thickness on the film was 170 m/min. The physical properties of the obtained coated film are shown in Table 1.

Example 3

10 kg of γ-aminopropyltrimethoxysilane was mixed with 7 kg of bisphenol A diglycidyl ether and 50 kg of methanol, and the mixture was reacted at 70° C. for 3 hours while stirred under nitrogen. After cooled to a room temperature, the resultant mixture was mixed with 0.2 kg of water and was stirred for 2 hours at a room temperature, and then, 10 kg of tetramethoxysilane was added thereto and was stirred for 24 hours. As a result, a coating composition was obtained. The obtained coating composition had a viscosity of 5 cps at 20° C. Repeating the process of Example 1, this coating composition was applied onto a PET film and then dried to obtain a coated film. The physical properties of the obtained coated film are shown in Table 2.

Example 4

Into a flask equipped with a stirrer, a thermometer, and a cooler, 7.18 kg of polyethylene imine (Epomin SP-018; product name, manufactured by Nippon Shokubai Co.), 3.25 kg of γ-glycidoxypropyltrimethoxysilane and 21.1 kg of methanol were charged, and the mixture was stirred at 65° C. for 3 hours under nitrogen, and then, was cooled to a room temperature. Subsequently, a mixture of 0.1 kg of water and 5 kg of methanol was added dropwide to the flask over 15 minutes, and was stirred at a room temperature for 1 hour. The resultant mixture was mixed with a mixture of 52.0 kg of tetramethoxysilane and 15.4 kg of methanol, and was stirred at a room temperature for 3 hours. As a result, a coating composition was obtained. The resultant coating composition had a viscosity of 7 cps at 20° C. Repeating the process of Example 2, this coating composition was applied onto a PET film and then dried to obtain a coated film. The physical properties of the obtained coated film are shown in Table 2.

Example 5

To 3 kg of tetraethoxysilane and 5 kg of methyltriethoxysilane, 50 kg of ethanol, 0.5 kg of water, and 0.3 kg of hydrochloric acid of 0.1N were added, and the mixture was stirred at a room temperature for 48 hours to obtain a coating composition. The resultant coating composition had a viscosity of 5 cps or less at 20° C. (Since the viscosity of 5 cps or less is too low value, it is impossible to make precise measurement of viscosity). Repeating the process of Example 1, this coating composition was applied onto a PET film and then dried to obtain a coated film. The coating and drying speed was 300 m/min, and the thickness of a coating layer after dried was 2.0 μm with good uniformity. In addition, no coating composition dripped from the slit during the coating process.

Comparative Examples 2 and 3

Repeating the process of Comparative Example 1, the coating compositions obtained in Examples 3 and 4 were applied onto the surface of a PET film. After 1 to 2 hours, both the coating compositions were gelated, so that it became impossible to continue the coating process in both cases. The physical properties of the obtained coated films before gelation are shown in Table 2.

In the physical properties tests, following methods were employed:
(Viscosity)
  Measured at 20° C. using B-type viscometer.
(Film thickness)
  An average thickness of coating layers of the obtained coated films after being dried.
(Drip of coating composition)
  Mark ○ indicates that no coating composition was dripped from the slit of extruder and all the coating composition was properly applied onto the surface of a substrate film. Mark x indicates that coating composition was dripped form the slit of extruder and not all the composition was applied onto the surface of a substrate film.
(Coating uniformity)
  The thickness of coating layer of the obtained coated film was measured per 500 m. Mark ⊚ indicates that all the thicknesses at measuring points were within ±3% of the average value of thickness, i.e., the uniformity was excellent. Mark ○ indicates that all the thicknesses at measuring points were within ±25% of the average thickness, i.e., the uniformity was good. Mark x indicates that not all the thicknesses at measuring points were within ±25% of the average thickness, i.e., the uniformity was poor.
(Oxygen permeability)
  Measured at 20° C. and 80% RH by Mokon method.

TABLE 1

| | Dripping of coating comp. | Thickness (μm) | Coating uniformity | Oxygen permeability | Coating speed (m/min) |
|---|---|---|---|---|---|
| Example 1 | ○ | 2.8 | ⊚ | 12 | 300 |
| Example 2 | ○ | 3.2 | ○ | 10 | 300 |
| Comparative Example 1 | ○ | 3.3 | ○ | 10 | 156 |

Oxygen permeability is in $cc/m^2 \cdot 24$ hrs $\cdot$ atm.

TABLE 2

| | Dripping of coating comp. | Thickness (μm) | Coating uniformity | Oxygen permeability | Coating speed (m/min) |
|---|---|---|---|---|---|
| Example 3 | ○ | 2.8 | ○ | 15 | 300 |
| Example 4 | ○ | 3.5 | ⊚ | 0.4 | 300 |
| Comparative Example 2 | — | 0.9 | x | 68 | 300 |

TABLE 2-continued

| | Dripping of coating comp. | Thickness (μm) | Coating uniformity | Oxygen permeability | Coating speed (m/min) |
|---|---|---|---|---|---|
| Comparative Example 3 | — | 0.7 | x | 25 | 300 |

Oxygen permeability is in $cc/m^2 \cdot 24$ hrs $\cdot$ atm.

Example 6

To 4 kg of tetraethoxysilane, 1.8 kg of hydrochloric acid of 0.1 N and 13 kg of water were added, and were stirred at a room temperature for 1 hour. To the resultant mixture, a polyvinyl alcohol solution was added, and was further stirred for 30 minutes. The polyvinyl alcohol solution was added in such a blending ratio that the weight ratio of the polyvinyl alcohol (solid content) becomes 1:1 based on the tetraethoxysilane converted into $SiO_2$. The resultant coating composition had a viscosity of 10cps at 20° C. Repeating the process of Example 1, this composition was applied onto a PET film and then dried to obtain a coated film. The coating and drying speed was 200 m/min, and the thickness of the coating layer after dried was 1.0 μm with good uniformity. In addition, no coating composition dripped from the slit during the coating process. The oxygen permeability was 1.5 $cc/m^2 \bullet 24$ hrs$\bullet$atm at 20° C. and 80% RH.

Example 7

Repeating the process of Example 1, 15% solution of Soanol 30L (ethylene-vinyl alcohol copolymer; product name, manufactured by Nippon Gosei Kagaku Kogyo Co., Ltd.) having a viscosity of 90 cps at 20° C. was applied onto a PET film and then dried to obtain a coated film. The coating and drying speed was 120 m/min, and the thickness of the coating layer after dried was 1.5 μm with good uniformity. In addition, no solution dripped form the slit during the coating process. The oxygen permeability was 10 $cc/m^2$.24 hrs.atm at 20° C. and 80% RH.

Example 8

To 45.4 kg of γ-aminopropyltrimethoxysilane, 10.4 kg of resorcinol diglycidyl ether and 50.0 kg of methanol were added, and reacted over 3 hours at 70° C. while stirring under nitrogen. The resultant mixture was cooled to a room temperature, and mixed with 35.9 kg of methanol, and then, a mixture of 3.6 kg of water and 47.2 kg of methanol was added dropwise thereto over 30 minutes. The resultant was stirred for one hour at a room temperature, and a mixture of 29.9 kg of M-Silicate 51 (tetramethoxysilane oligomer; product name, manufactured by Tama Kagaku Co., Ltd.) and 20.0 kg of methanol was added dripwise thereto over 30 minutes. Then, the resultant was further mixed with the mixture of 5.5 kg of water and 74.6 kg of methanol and stirred for 24 hours to obtain a coating composition. The resultant coating composition had a viscosity of 10 cps at 20° C. Repeating the process of Example 1, the coating composition was applied to a PET film and then dried to obtain a coated film. The coating and drying speed was 150 m/min, and the thickness of the coating layer after dried was 1.5 μm with good uniformity. In addition, no coating composition dripped from the slit during the coating process. The oxygen permeability was 1.0 $cc/m^2 \bullet 24$ hrs$\bullet$atm at 20° C. and 80% RH.

Example 9

The procedure of Example 1 was repeated using the polyvinylidene chloride used in Example 1 except employing the coating speed of 450 m/min; whereby a coated film was obtained. The thickness of coating layer after dried was 2.3 μm with good uniformity. In addition, no coating composition dripped from the slit during the coating process. The oxygen permeability was 15 cc/m².24 hrs.atm at 20° C. and 80% RH.

Example 10

The procedure of Example 1 was repeated using the coating composition obtained in Example 8 except employing the coating speed of 50 m/min and the extruder shown in FIG. 2. The coating composition was applied on both surfaces of a polycarbonate film having a thickness of 100 μm and then dried to obtain a coated film. The thickness of the coating layer after dried was 1.0 μm on both surfaces of the coated film with excellent uniformity. In addition, no coating composition dripped from the slit during the coating process. The oxygen permeability was 0.2 cc/m².24 hrs.atm at 20° C. and 80% RH.

According to the present invention, it is possible to apply a coating composition having a low viscosity onto a substrate film at speed as high as 300 m/min or more. Since the coating composition never adversely affected by the air, the process of the present invention is useful for continuously applying hydrolytic composition, composition easy to be oxidized, photocurable coating composition, and the like. In addition, all the coating composition accommodated in the extruder can be applied onto the surface of a substrate film to be used up with no waste, unlike a conventional roller coating process. Therefore, the process of the present invention is also extremely useful for continuously applying a relatively expensive gas barrier coating composition to produce a coating thin layer to a uniform thickness.

What is claimed is:

1. A process for producing a coated film continuously, consisting essentially of:
   running a substrate film; and
   extruding a coating composition, having a viscosity of 0.1–100 cps at 20° C. and which undergoes hydrolytic condensation with moisture present in the air, through a slit of a die of a closed extruder onto a surface of the substrate film thereby producing a coated layer;
   moistening the coated layer under an atmosphere of at least 5% relative humidity before, during or after heating of the coated substrate which follows moistening; and
   heating the coated substrate thereby drying the coated layer such that it has an oxygen permeability of 20 cc/m².24 hours.atm or lower at 20° C. and 80% relative humidity, a surface smoothness of ±25% per 500 m and a thickness of 0.5–10 μm;
   wherein said coating composition comprises an organosilane compound of formula (I) and/or a hydrolytic condensation product thereof:

$$R^1{}_m Si(OR^2)_n, \quad (I)$$

wherein $R^1$ is hydrogen, lower alkyl, allyl, a mercapto group directly bonded to a vinyl group or a carbon chain, amino or (meth)acryloyl; each $R^2$ is the same or different and is hydrogen, lower alkyl or acyl; $R^1$ and $R^2$ each may have an arbitrary substituent; m is 0 or 1; n is 3 or 4 and m+n is 4; and a solvent.

2. The process according to claim 1, wherein the viscosity of said coating composition ranges from 0.1–20 cps.

3. The process according to claim 1, wherein at least some of the molecules of organometallic compound (I) are an organosilane compound in which $R^1$ is an amino group.

4. The process according to claim 1, wherein the coating composition further comprises a primary or secondary amino group containing organic compound (II).

5. The process according to claim 4, wherein the coating composition further comprises an organic compound (III) having a functional group which is reactive with said amino group of the molecule of compound (II).

6. The process according to claim 1, wherein the coating composition provides a coated layer having gas barrier properties.

7. The process according to claim 1, wherein the viscosity of said coating composition ranges from 1–50 cps.

8. The process according to claim 1, wherein the speed of the running substrate film ranges from 10–550 m/min.

9. The process according to claim 8, wherein said running speed is 30–500 m/min.

10. The process according to claim 9, wherein said running speed is 50–450 m/min.

11. The process according to claim 1, wherein said coated layer thickness ranges from 1–5 μm.

12. The process according to claim 1, which further comprises:
    drying the coated layer by passing the coated substrate through a heating furnace adjusted to a temperature of 40° C. or higher.

13. The process according to claim 12, wherein the temperature within the furnace ranges from 50–120° C.

14. A process for producing a coated film continuously, consisting essentially of:
    running a substrate film; and
    extruding a coating composition, having a viscosity of 0.1–100 cps at 20° C. and which undergoes hydrolytic condensation with moisture present in the air, through a slit of a die of a closed extruder onto a surface of the substrate film thereby producing a coated layer;
    moistening the coated layer under an atmosphere of at least 5% relative humidity before, during or after heating of the coated substrate which follows moistening; and
    heating the coated substrate thereby drying the coated layer such that it has an oxygen permeability of 20 cc/m²•24 hours•atm or lower at 20° C. and 80% relative humidity, a surface smoothness of ±25% per 500 m and a thickness of 0.5–10 μm;
    wherein said coating composition comprises an organosilane compound of formula (I) and/or a hydrolytic condensation product thereof:

$$R^1{}_m Si(OR^2)_n, \quad (I)$$

wherein $R^1$ is hydrogen, lower alkyl, allyl, a mercapto group directly bonded to a vinyl group or a carbon chain, amino or (meth)acryloyl; each $R^2$ is the same or different and is hydrogen, lower alkyl or acyl; $R^1$ and $R^2$ each may have an arbitrary substituent; m is 0 or 1; n is 3 or 4 and m+n is 4; an organometallic compound of formula (I') and/or a hydrolytic condensation product thereof;

$$R^1{}_p M(OR^2)_q, \quad (I')$$

wherein M is a metal element other than Si; each $R^1$ is the same or different and is hydrogen, lower alkyl, allyl, a mercapto group directly bonded to a vinyl group or a carbon chain, amino or (meth)acryloyl; each $R^2$ is the same or different and is hydrogen, lower alkyl or acyl; $R^1$ and $R^2$ each may have an arbitrary substituent; p is 0 or a positive integer; q is an integer of 1 or more and p+q is equal to the valency of metal element M; and a solvent.

15. The process according to claim 14, wherein at least some of the molecules of organometallic compound (I) are an organosilane compound in which $R^1$ is an amino group.

16. The process according to claim 14, wherein the coating composition further comprises a primary or secondary amino group containing organic compound (II).

17. The process according to claim 16, wherein the coating composition further comprises an organic compound (III) having a functional group which is reactive with said amino group of the molecule of compound (II).

18. The process according to claim 14, which further comprises:

drying the coated layer by passing the coated substrate through a heating furnace adjusted to a temperature of 40° C. or higher.

19. The process according to claim 18, wherein the temperature within the furnace ranges from 50–120° C.

* * * * *